3,010,683
INTEGRAL CABLE SUPPORTS
Robert B. Cotton, Media, Pa., assignor to All American Engineering Company, Wilmington, Del., a corporation of Delaware
Filed Oct. 12, 1959, Ser. No. 845,936
2 Claims. (Cl. 244—110)

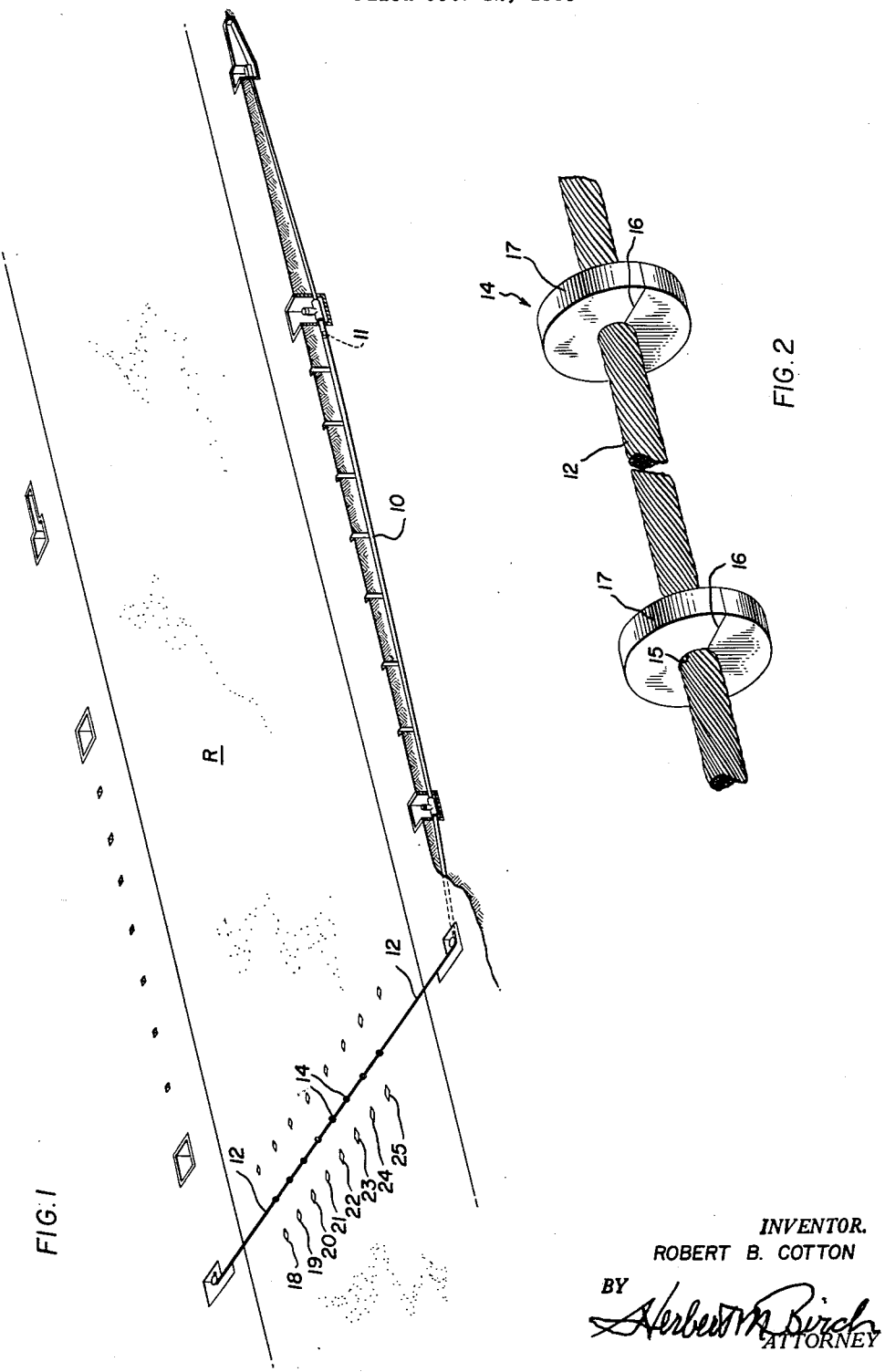

The present invention relates to supports for aircraft deck pendants, that is, arresting cable means, which extend across the runway surface to be engaged by an arresting hook equipped aircraft.

The deck pendant or arresting cable for engagement by an arresting hook must be maintained in an elevated position above the surface of the deck or runway surface so the hook can engage it properly. Prior arresting cable supports have been used on shipboard and on land based airport runways, but such cable supports are complex and of a construction requiring permanent installation in the runway surface, and interfere with runway surface cleaning or maintenance and often provide unsafe obstructions. Accordingly, an object of this invention is to provide a deck pendant support or runway surface arresting cable support that requires no attachment to the deck or runway surface and thus does not interfere with runway cleaning or maintenance.

Another object is to provide an integral cable elevator of simple form adapted to be manually applied to the cable.

A further object is to provide in combination a plurality of arrest cable supports and a novel runway surface having predetermined spacing of markings thereon in a pattern for spotting each respective support in a predetermined spaced position on the arrest cable with respect to the runway surface spotting marks.

Once the proper pattern for spacing of the supports has been determined, the desired position of each support can be slidably adjusted to a respective runway pattern mark for quick and easy repositioning after each aircraft arrest.

Still a further object is to provide a simple article of manufacture, which is economical to produce and simple to install on the arrest cable for highly efficient arrest operations.

Other objects and advantages will become apparent in the course of the following detailed description, taken in connection with the accompanying drawings, wherein:

FIGURE 1 is a plan view of a runway surface, a transverse pendant or arrest cable supported thereon and a schematic illustration of the arresting gear installation on the sides of the runway;

FIGURE 2 is a fragmentary perspective view of the novel cable supports mounted in position on an arrest cable.

Referring in detail to the drawings and first with particular reference to FIGURE 1, there is shown an aircraft arresting system of the type illustrated in Patents 2,731,219; and 2,777,653, issued to Robert B. Cotton and Donald B. Doolittle, also assigned to the present assignee. This system includes liquid filled tubing 10 positioned on one or both sides of a landing surface, such as a ship deck, air field runway R or the like, and from the tubing extending across the runway is an arresting cable 12, usually termed a deck or runway pendant. This cable 12 is connected to suitable arresting pistons 11 in the tubing 10 as in the above noted patents.

As illustrated in Patent No. 2,777,653 it is desirable to elevate the arresting cable 12 above the landing surface R to permit the same to be properly spaced thereabove for engagement by a hook-equipped aircraft. Also when only one arrest unit is used, the arrest cable 12 may be in the form of a loop mounted as is illustrated in Patent No. 2,731,219, issued to Robert B. Cotton and Donald B. Doolittle, the arrest cable or arresting gear pendant support of this invention comprises a disk 14 formed with a central aperture 15 and a radial slit 16 extending from the peripheral rim 17 of the disk to and through the annular wall, which defines a central bore in the provision of an annular aperture 15, said wall being concentric with respect to said rim 17. The disk may be made of any suitable material, such as rubber, neoprene and the like, and it is arranged to be manually spread apart at the slit 16 and placed over the cable 12, so the cable extends through the respective disk aperture 15.

The aperture 15 in each disk is of a diameter slightly larger than the diameter of the arresting cable being used; to permit the disks to be manually adjustable, that is, slidable on the cable for the estimated spacing of the elevator disks 14, for example, of from six to eight feet. This spacing is varied for each installation, as variations in the runway crown will have some effect on the arrest cable height above the runway surface R. Also, the spacing is determined by the wheel spacing of landing aircraft, to permit the landing wheels to straddle and go between the disks in most instances. However, the elevator disks 14 are not of a size and bulk or of a material such as to cause any damage to the landing equipment or undercarriages of any landing aircraft should one of the aircraft wheels contact a disk while landing. For example, the usual size of the elevator disks 14 used with a three-quarter inch arrest cable may be three inches in diameter and approximately one inch thick at the peripheral rim 17. Thus when the elevator disks 14 are in their respective predetermined operative spaced position on the cable 12, the respective rims 17 thereof rest upon the runway surface R and maintain the cable at a desired clearance, for example of at least three-quarters of an inch above the runway surface.

The runway surface R may be of any material as the occasion presents and it is preferred to provide a pattern of disk position markings 18, 19, 20, 21, 22, 23, 24 and 25 across the surface in predetermined spaced alignment. Such spaces between pattern markings as above stated may be of any predetermined distance, for example 6 or 8 feet apart. In some instances the runway surface R may be marked in patterned areas with several rows of markings as illustrated in FIGURE 1, that is, one respective row of marks may be at a distance of six feet apart, the next at eight feet and the next again at six feet or some other desired distance. Thus by marking the runway surface with alternately differently spaced markings the disks 14 may be accurately positioned on the arrest cable 12 to various distance spacings as required for each arrest.

The use and operation of the device is believed clear from the foregoing description, for example, prior to an arrest a desired number of supports 14 are selected and manually applied to the arrest cable 12. The supports after they are placed on the cable may be adjusted to position by sliding the same along the cable to the pattern spots marked on the runway for either a six or an eight foot spacing to properly maintain the cable elevated to the desired height for the most efficient hook engagement.

After an arrest has been made, the cable 12 is returned to position for the next arrest, by quickly spotting the supports on the runway surface markings. This rapid reset of the arresting cable 12 and supports 14 to arrest position is very important when landing rapidly incoming aircraft either on land or on shipboard.

Although only one embodiment of the invention has been illustrated and described in detail, it is to be expressly understood that the invention is not limited thereto and various changes may be made in the design, arrangement and combination of parts without departing from the spirit and scope of the invention, as will more likely occur to others skilled in the art. For a definition of the limits of

What is claimed is:

1. An integral arrest cable support means, in the combination with an aircraft arrest cable and runway surface, said support means comprising a solid disc of a predetermined weight, diameter and thickness having continuous side surfaces, said disc having a peripheral rim in the provision of an annular supporting surface, and a central aperture formed in the disc for an arrest cable, said aperture being defined by an annular wall concentric to the said annular surface of said rim, said annular wall of said disc surrounding a portion of the exterior diameter of said cable, and said weight, diameter and thickness of said disc being sufficient to retain engagement with a runway surface, while holding the cable elevated above said runway surface.

2. An integral arrest cable support means, in combination with an aircraft arrest cable and runway surface, as described in claim 1, wherein the said disc is formed with a slit from said rim to the bore of said aperture, said slit normally being closed.

References Cited in the file of this patent

UNITED STATES PATENTS

| | | |
|---|---|---|
| 2,128,434 | Seeley | Aug. 30, 1938 |
| 2,526,348 | Gouge | Oct. 17, 1950 |
| 2,526,541 | Colley | Oct. 17, 1950 |
| 2,771,502 | King et al. | Nov. 20, 1956 |